(12) United States Patent
Prager

(10) Patent No.: US 9,940,355 B2
(45) Date of Patent: *Apr. 10, 2018

(54) PROVIDING ANSWERS TO QUESTIONS HAVING BOTH RANKABLE AND PROBABILISTIC COMPONENTS

(71) Applicant: International Business Machines Corporation, Armonk, NY (US)

(72) Inventor: John Martin Prager, Pomona, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/862,543

(22) Filed: Sep. 23, 2015

(65) Prior Publication Data

US 2016/0267392 A1    Sep. 15, 2016

Related U.S. Application Data

(63) Continuation of application No. 14/641,467, filed on Mar. 9, 2015.

(51) Int. Cl.
| | | |
|---|---|---|
| *G06F 17/30* | (2006.01) | |
| *G06N 7/00* | (2006.01) | |
| *G06F 17/28* | (2006.01) | |
| *G06F 17/27* | (2006.01) | |

(52) U.S. Cl.
CPC ...... *G06F 17/3043* (2013.01); *G06F 17/2785* (2013.01); *G06F 17/28* (2013.01); *G06F 17/30654* (2013.01); *G06F 17/30687* (2013.01); *G06N 7/005* (2013.01)

(58) Field of Classification Search
None
See application file for complete search history.

(56) References Cited

U.S. PATENT DOCUMENTS

| | | |
|---|---|---|
| 6,584,470 B2 | 6/2003 | Veale |
| 6,766,316 B2 | 7/2004 | Caudill et al. |
| 7,660,783 B2 | 2/2010 | Reed |

(Continued)

OTHER PUBLICATIONS

IBM, List of IBM Patents or Patent Applications Treated as Related, Appendix P, dated Feb. 26, 2016, 2 pages.

(Continued)

*Primary Examiner* — Alan Chen
(74) *Attorney, Agent, or Firm* — David Zwick

(57) ABSTRACT

Providing answers to questions. A LAT, a rankable criterion, and a probabilistic criterion are identified in a received query. A set of candidate answers to the question that are instances of the LAT identified in a first data source is generated. Based on the rankable criterion, the candidate answers are ranked. Each candidate answer is assigned a likelihood that the candidate answer satisfies the probabilistic criterion, based on a statistic of occurrences of terms related to the candidate answer and the probabilistic criterion in text passages from a second data source. One or more candidate answers are selected based on the rank and the likelihood of the candidate answers. In another aspect of the invention, a Boolean criterion is also identified in the query and the set of candidate answers is reduced by applying the Boolean criterion.

4 Claims, 6 Drawing Sheets

(56) References Cited

U.S. PATENT DOCUMENTS

| | | | |
|---|---|---|---|
| 7,849,049 B2 | 12/2010 | Langseth et al. | |
| 8,275,803 B2 | 9/2012 | Brown et al. | |
| 8,819,007 B2 | 8/2014 | Brown et al. | |
| 2012/0078888 A1* | 3/2012 | Brown | G06F 17/30654 707/723 |
| 2013/0007033 A1 | 1/2013 | Brown et al. | |
| 2013/0288219 A1 | 10/2013 | Dheap et al. | |
| 2016/0179939 A1* | 6/2016 | Levas | G06F 17/30684 707/728 |

OTHER PUBLICATIONS

Pending U.S. Appl. No. 14/641,467, dated Mar. 9, 2015, Entitled: "Providing Answers to Questions Having Both Rankable and Probabilistic Components".

Ferrucci, "Introduction to 'This is Watson'", IBM Journal of Research & Development, vol. 56, No. 3/4, Paper 1, May/Jul. 2012, pp. 1:1-1:15.

Zhang et al., "New Information Distance Measure and Its Application in Question Answering System," Journal of Computer Science and Technology, vol. 23, Issue 4, Jul. 2008, pp. 557-572.

Allan et al., Challenges in Information Retrieval and Language Modeling, Report of a Workshop held at the Center for Intelligent Information Retrieval, University of Masschusettes Amherst, Sep. 2002, ACM SIGIR Forum, vol. 37, Issue 1, Spring 2003, pp. 1-17.

Clarke et al., Statistical Selection of Exact Answers (MultiText Experiments for TREC 2002), School of Computer Science, University of Waterloo, pp. 1-9.

Fan et al., "Tapping the Power of Text Mining," Communications of the ACM, Sep. 2006, vol. 49. No. 9, pp. 77-82.

Moldovan et al., "LCC Tools for Question Answering," Proceedings of the 11th Text Retrieval Conference TREC-2002, NIST, Gaithersburg, (2002), pp. 1-10.

Weikum et al., "Database and Information-Retrieval Methods for Knowledge Discovery," Communications of the ACM, Apr. 2009, vol. 52, No. 4, pp. 56-64.

Lally et al., "Question analysis: How Watson reads a clue," IBM Journal of Research & Development, vol. 56, No. 3/4, Paper 2, May/Jul. 2012, pp. 2:1-2:14.

Barker, "Combining Structured and Unstructured Knowledge Sources for Question Answering in Watson," Proceedings of the 8th International Conference on Data Integration in the Life Sciences 2012, LNBI 7348.

McCord et al., "Deep parsing in Watson," IBM Journal of Research & Development, vol. 56, No. 3/4, Paper 3, May/Jul. 2012, pp. 3:1-3:15.

Chu-Carroll et al., "Textual resource acquisition and engineering," IBM Journal of Research & Development, vol. 56, No. 3/4, Paper 4, May/Jul. 2012, pp. 4:1-4:11.

Fan et al., "Automatic knowledge extraction from documents," IBM Journal of Research & Development, vol. 56, No. 3/4, Paper 5, May/Jul. 2012, pp. 5:1-5:10.

Chu-Carroll et al., "Finding needles in the haystack: Search and candidate generation," IBM Journal of Research & Development, vol. 56, No. 3/4, Paper 6, May/Jul. 2012, pp. 6:1-6:12.

Murdock et al., "Typing candidate answers using type coercion," IBM Journal of Research & Development, vol. 56, No. 3/4, Paper 7, May/Jul. 2012, pp. 7:1-7:13.

Murdock et al., "Textual evidence gathering and analysis," IBM Journal of Research & Development, vol. 56, No. 3/4, Paper 8, May/Jul. 2012, pp. 8:1-8:14.

Wang et al., "Relation extraction and scoring in DeepQA," IBM Journal of Research & Development, vol. 56, No. 3/4, Paper 9, May/Jul. 2012, pp. 9:1-9:12.

Kalyanpur et al., "Structured data and inference in DeepQA," IBM Journal of Research & Development, vol. 56, No. 3/4, Paper 10, May/Jul. 2012, pp. 10:1-10:14.

Prager et al., "Special Questions and techniques," IBM Journal of Research & Development, vol. 56, No. 3/4, Paper 11, May/Jul. 2012, pp. 11:1-11:13.

Chu-Carroll et al., "Identifying implicit relationships," IBM Journal of Research & Development, vol. 56, No. 3/4, Paper 12, May/Jul. 2012, pp. 12:1-12:10.

Kalyanpur et al., "Fact-based question decomposition in DeepQA," IBM Journal of Research & Development, vol. 56, No. 3/4, Paper 13, May/Jul. 2012, pp. 13:1-13:11.

Gondek et al., "A framework for merging and ranking of answers in DeepQA," IBM Journal of Research & Development, vol. 56, No. 3/4, Paper 14, May/Jul. 2012, pp. 14:1-14:12.

Epstein et al., "Making Watson fast," IBM Journal of Research & Development, vol. 56, No. 3/4, Paper 15, May/ Jul. 2012, pp. 15:1-15:12.

Tesauro et al., "Simulation, learning, and optimization techniques in Watson's game strategies," IBM Journal of Research & Development, vol. 56, No. 3/4, Paper 16, May/Jul. 2012, pp. 16:1-16:11.

Lewis, "In the game: The interface between Watson and Jeopardy!," IBM Journal of Research & Development, vol. 56, No. 3/4, Paper 17, May/Jul. 2012, pp. 17:1-17:6.

Mell et al., "The NIST Definition of Cloud Computing," National Institute of Standards and Technology, Information Technology Laboratory, Version 15, Oct. 7, 2009.

Pending U.S. Appl. No. 14/641,467, filed Mar. 9, 2015, entitled: "Providing Answers to Questions Having Both Rankable and Probabilistic Components", 44 pages.

* cited by examiner

PROVIDING ANSWERS TO QUESTIONS HAVING BOTH RANKABLE AND PROBABILISTIC COMPONENTS

BACKGROUND

The present invention relates generally to the field of question answering technology, and more particularly to reconciling simultaneous ranking criteria in generating answers.

Question Answering (QA) is a computer science discipline within the fields of information retrieval and natural language processing (NLP) which is concerned with building systems that automatically answer questions posed in a natural language. A QA implementation, usually a computer program, may construct answers by querying a structured database, or table, of knowledge or information, such as a knowledge base. More commonly, QA systems may generate answers from an unstructured collection of natural language documents, or text corpus.

Unstructured data refers to information that is not organized according to a data model, which specifies how the data items relate to one another. Unstructured information is typically text heavy, but may contain data such as dates, numbers, and facts as well. Unstructured data may be indexed. For example, the occurrences of each word in a text document of unstructured data may be recorded in an index structure. Structured data is data that is organized according to a data model or schema. Generally, the term structured data is applied to relational databases and unstructured data applies to everything else.

Superlative/ordinal, or rankable, QA answers questions that include an ordinal, giving a rank or position in a sequence, such as "first", "second", or "last"; or a superlative, indicating being of extreme degree, such as "largest", "smallest", or "fastest"; or a combination of superlative and ordinal, such as "second largest". Examples of rankable questions include "Who was the first/10th/most recent president?", "What is the largest state?", and "What is the 3rd tallest mountain?". This type of QA typically requires lookup in a structured database or knowledge base.

Rankable criteria for structured data are often paired with Boolean filters, which may reduce the set of possible answers. For example, in the question "Who was the last Republican president?", the word "Republican" acts as a Boolean filter on the set of presidents. The term Boolean implies that a given criterion is either entirely true or entirely false for the objects considered.

Non-rankable QA addresses questions that are not posed as rankable questions. Examples include "Which president had a handlebar mustache?" or "What country exports coffee and is home to elephants?". Since structured data may not exist to answer this type of question, this type of QA typically requires identifying passages in an unstructured text corpus, for example, using keywords in the question, in order to estimate the probability that a candidate answer is correct. QA systems that operate in this way are referred to as probabilistic QA systems.

SUMMARY

Embodiments of the present invention disclose a computer-implemented method, computer program product, and system for providing answers to questions. A question is received. A lexical answer type (LAT), a rankable criterion, and a probabilistic criterion in the question are identified. A set of candidate answers to the question that are instances of the LAT identified in a first data source is generated. Based on the rankable criterion, the candidate answers are ranked. To each candidate answer is assigned a likelihood that the candidate answer satisfies the probabilistic criterion, based on a statistic of occurrences of terms related to the candidate answer and to the probabilistic criterion in text passages from a second data source. One or more of the candidate answers are selected based on the rank and the likelihood of the candidate answers. The selected candidate answers are transmitted.

In another aspect of the invention a LAT, a rankable criterion, a probabilistic criterion, and a Boolean criterion are identified in the question. The set of candidate answers is reduced by applying the Boolean criterion.

DETAILED DESCRIPTION

Embodiments of the present invention are directed to rankable-probabilistic QA systems (RPQA) that may receive queries having both a superlative/ordinal, or rankable, component, and a probabilistic component, and which access structured and unstructured data sources to generate a ranked list of candidate answers. For example, in the question "Who was the last president to serve in the military?", "last" defines a rankable component and "serve in the military" defines a probabilistic component. The final ranking reconciles the rankable criteria and the probabilistic criteria.

The terms "question" and "query," and their extensions, may be used interchangeably and refer to the same concept, namely a request for information received by the RPQA system. Such requests are typically in the form of an interrogative sentence in a natural language, but they may also be in other forms, for example as a declarative sentence providing a description of an entity of interest, where the request for the identification of the entity can be determined from the sentence. A query may also be generated via a graphical user interface (GUI), for example as part of an expert system. In this case, a user may construct a query by manipulating graphical control elements in the GUI.

Structured data is defined as information that is explicitly represented in the structure or format of the data, for example a database table, and whose intended meaning is unambiguous. Structured data is generally stored in structured data sources, such as relational databases and certain hierarchical knowledge bases. Semi-structured data is a form of structured data that does not conform to the formal structure of data models associated with relational databases or other forms of data tables, but nonetheless contains tags or other markers to separate semantic elements and enforce hierarchies of records and fields within the data. Examples of semi-structured data include XML documents and email. Unstructured data is defined as information whose intended meaning can be implied by its content, for example a natural language document. Unstructured data is stored in unstructured data sources, which may include text corpora and other datastores of natural language documents. Structured data may also be found in unstructured data sources, for example as a table embedded in a Web page.

Figure 1:
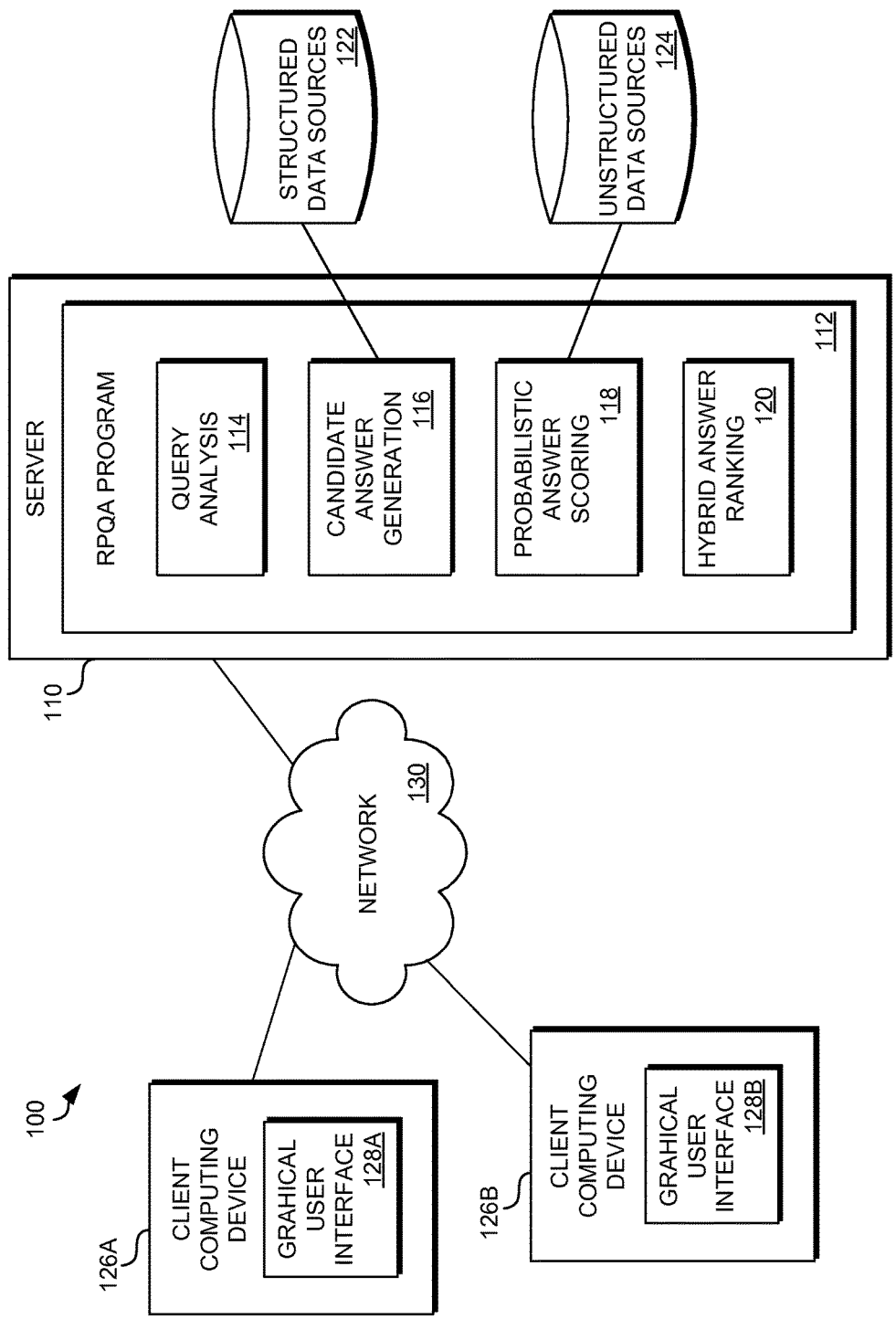
FIG. 1 is a functional block diagram of a rankable-probabilistic question answering (RPQA) system, in accordance with an embodiment of the present invention.

FIG. 1 is a functional block diagram of an RPQA system 100, in accordance with an embodiment of the present invention. RPQA system 100 includes server 110 and client computing devices 126, all interconnected over a network 130.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and client computing devices 126, in accordance with embodiments of the invention.

In an exemplary embodiment, client computing devices 126 represent a source of queries that are received by server 110. Client computing devices 126 may include graphical user interfaces 128, by which a user may enter a query and receive an answer. In various embodiments, graphical user interfaces 128 may be, for example, web browsers that receive web pages transmitted by server 110, or dedicated applications that interface with RPQA program 112 on server 110. In other embodiments, client computing devices 126 may represent other sources of queries, for example, expert systems, speech recognition systems coupled to voice entry devices, other servers, etc.

In various embodiments of the invention, a client computing device 126 may be, for example, a laptop computer, tablet computer, netbook computer, personal computer (PC), a desktop computer, a personal digital assistant (PDA), or a smart phone. In general, a client computing device 126 may be any programmable electronic device capable of communicating with server 110 via network 130, and of supporting functionality as required by one or more embodiments of the invention. A client computing device 126 may include internal and external hardware components as depicted and described in further detail below with reference to FIG. 3.

Server 110 represents the computing environment or platform that hosts RPQA program 112. In various embodiments, server 110 may be a laptop computer, netbook computer, personal computer (PC), a desktop computer, or any programmable electronic device capable of hosting RPQA program 112, described below, and communicating with client computing devices 126 via network 130, in accordance with embodiments of the invention. Server 110 may include internal and external hardware components, as depicted and described in further detail below with reference to FIG. 3. In various embodiments, client computing device 126 and server 110 may be one and the same. In other embodiments, server 110 may represent a cloud computing environment, as described in relation to FIGS. 4, 5, and 6, below.

In an embodiment of the invention, server 110 includes RPQA program 112. RPQA program 112 may further include query analysis module 114, candidate answer generation module 116, probabilistic answer scoring module 118, hybrid answer ranking module 120, structured data sources 122, and unstructured data sources 124.

In an exemplary embodiment of the invention, query analysis module 114 operates generally to receive an input query, for example from a client computing device 126, and identify in the query a lexical answer type, a set of Boolean criteria, CB, a set of rankable criteria, CR, and a set of probabilistic criteria, CP.

In an embodiment of the invention, query analysis module 114 may locate and classify elements in the query into predefined categories, such as names of persons, organizations, locations, time expressions, quantities, plants, animals, or events by, for example, named entity recognition (NER) programs. Query analysis module 114 may then determine the grammatical structure of the query, for example, which groups of words go together as phrases and which words are the subject or object of a verb by, for example, natural language parsing programs. This may include tagging the words of the query with parts of speech, such as nouns, verbs, adjectives, adverbs, pronouns, conjunctions, prepositions, interjections, and articles. This may be accomplished, for example, using the Stanford Parser, version 3.5.1, available from The Stanford Natural Language Processing Group at Stanford University, or other proprietary and/or open source parsers.

A lexical answer type (LAT) is a word or noun phrase in a question that specifies the type of the answer. For example, in the question "Who was the last president to have served in the military?" the LAT is "president." A question may contain multiple LATs. Identifying the LATs in the query may be accomplished by keyword extraction, in conjunction with classifying the elements in the query into predefined categories, for example, via an NER program, determining the grammatical structure of the query, and tagging the words in the query with parts of speech. For example, a defined list of LATs may include one or more keywords associated with each LAT. If a keyword is found in the query, for example, an interrogative keyword such as "Who", "Where", or "How many", this may indicate that the LAT should be "Person", "Location", or "Number", respectively. The keyword word "When" may indicate that the LAT may be of type "Date".

CR in the query may be identified via comparison in a knowledge base with the extracted keywords and the identified parts of speech. For example, except for a handful of exceptions such as "worst", superlatives are usually adjectives preceded by "the" and ending in "est", or preceded by "the most". Superlatives also normally come before any other adjectives modifying a noun. Except for a few exceptions, such as "primary" and "penultimate", ordinals usually derive from numbers and carry one of the suffixes "nd", "rd", "st", or "th". Examples include seventh, twenty-third, 15th, and 41st.

CB candidates may be words or phrases in a query which modify LATs, such as adjectives or prepositional phrases. CB candidates may be identified, for example, by a natural language parser. In an embodiment, an identified CB candidate may be in CB if, for example, the modifying phrase appears as a column heading of a table in structured data sources 122, listing instances of the LAT, with column entries "yes" or "no"; or alternatively, the adjective or adjective phrase is a valid column entry in such a table with an appropriate categorical column heading. For example, for the query "Who was the last Republican president to serve in the military?", the term "Republican" may be identified as in CB if a table of presidents may be found in structured data sources 122, in which "Republican" appears, or could appear, as an entry in a column with heading "Party Affiliation".

CP candidates may be words or phrases in the query which modify LATs, such as adjectives or prepositional phrases. CP candidates may be identified, for example, by a natural language parser. An identified CP candidate may be in CP if it is not identified as being in CR or CB, as described above.

For example, for the query "Who was the last Republican president to serve in the military?", the LAT may be "president", CB may be "Republican", CR may be the superlative "last", and CP may be "served in the military". In other exemplary queries, CB may not be present.

In an exemplary embodiment of the invention, candidate answer generation module 116 operates generally to receive the parsed query from query analysis module 114, and access and analyze documents in structured data sources 122, based on information associated with the parsed query, to create a list of candidate answers to a query received by RPQA program 112. The candidate answers, which may be instances of a LAT identified by query analysis module 114, may be filtered via CB identified by query analysis module 114, and ranked according to CR identified by query analysis module 114.

Candidate answer generation module 116 operates generally to identify initial candidate answers to the query, based on information in structured data sources 122. Candidate answer generation module 116 accesses and analyzes documents in structured data sources 122, described in more detail below, to determine whether the LAT identified by query analysis module 114 forms a closed class with known instances, identifies a set of known instances of the LAT, and creates a list of candidate answers, filtered via CB, and ranked according to CR. In some cases, certain candidate answers in the list may be equally ranked. Typically, LATs that form a closed class with known instances, which may be filtered via CB and ranked according to CR, may be found in structured data sources 122 in the form of a table or fixed list, ordered according to CR and annotated to indicate compliance with CB. For example, for the query "Who was the last Republican president to serve in the military?", the initial list of candidate answers may be derived from a table of presidents, for example, found in structured data sources 122, ordered by election date, and tagged with party affiliation. Since CR is the superlative "last", the initial list of candidate answers may be ordered from last to first, so that the "top" answer is the first one. In embodiments in which multiple LATs may be identified by query analysis module 114, candidate answer generation module 116 may identify candidate answers that are jointly instances of all the identified LATs.

In some embodiments, candidate answer generation module 116 may extend an identified LAT by combining it with one or more modifying phrases, which are identified as Boolean or probabilistic criteria. If, for example, a LAT, together with a modifying phrase, appears as a column heading of a table in structured data sources 122, listing instances of the extended LAT, then the extended LAT may be used instead of the identified LAT. If, for example, for the query "Who was the last Republican president to serve in the military?", a table of Republican presidents may be found in structured data sources 122, then "Republican president" may serve as the LAT and there may be no Boolean criterion. For the query "Who was the first woman in space who owned a dog?", for example, "woman" may be identified as a LAT, while "in space" and "owned a dog" may be identified as CP. However, "woman" does not form a closed class with known instances, while "woman in space" does, hence a search in structured data sources 122 may identify a table of women in space. In this case, "woman in space" may serve as the LAT and CP may be "owned a dog".

Structured data sources 122 represents a store of structured or semi-structured data that may be processed in the context of an RPQA system, in accordance with an embodiment of the invention. Structured data sources 122 may reside, for example, on computer readable storage media 308 (FIG. 3), and/or on cloud computing node storage system 34 (FIG. 4). The structured data may include documents, for example, text documents, such as documents generated by Microsoft Word®, OpenOffice® Writer®, or other proprietary or open source word processing systems. The structured data may also include records, or fields within records, created by special purpose application systems. For example, in an exemplary embodiment, a structured data item may be one or more medical case note entries in an electronic health record (EHR) or electronic medical record (EMR) created by a medical professional during a patient examination using a proprietary or open source EHR/EMR system. In other embodiments, the structured data may include data in other forms, such as a video, a picture, a file written in HTML, or other formats such as text, XML, or PDF.

In an exemplary embodiment of the invention, probabilistic answer scoring module 118 receives the ranked list of candidate answers generated by the candidate answer generation module 116, and utilizes documents from unstructured data sources 124 to assign a likelihood to each element in the ranked list of candidate answers generated by the candidate answer generation module 116. The likelihood represents the probability that the candidate answer satisfies CP, for example, a statistic of occurrences of terms related to the candidate answer and to CP in text passages from unstructured data sources 124. For example, for the query "Who was the last Republican president to serve in the military?", the likelihood might represent the probability that a president had served in the military, based on an analysis of text passages retrieved from the unstructured data sources 124. In computing a likelihood, probabilistic answer module 118 may consider the degree of match between the retrieved passages' predicate-argument structure and CP, passage source reliability, geospatial location, temporal relationships, taxonomic classification, lexical and semantic relations the candidate is known to participate in, the candidate's correlation with the terms of CP, its popularity (or obscurity), its aliases, and so on. For example, in a typical embodiment, probabilistic answer scoring module 118 may combine the candidate answer with the probabilistic component of the query in searching the unstructured data sources 124 to retrieve short passages, or snippets, that contain the candidate answer in the context of the terms of CP, use an NLP topic modeling technique such as Latent Dirichlet Allocation to learn a set of topics, or words that tend to appear together, from snippets, as well as probabilities that a snippet belongs to each topic, and use these probabilities to compute the probability of CP given the candidate answer, for example, by using Bayes' rule.

In other embodiments of the invention, probabilistic answer scoring module 118 may identify, based on a threshold value or filter, a subset of the ranked candidate answers generated by candidate answer generation module 116, and may assign a likelihood only to elements in the subset of ranked of candidate answers.

Unstructured data sources 124 represents a store of unstructured data that may be processed in the context of the RPQA system, typically text corpora. Unstructured data sources 124 may reside, for example, on computer readable storage media 308 (FIG. 3), and/or on cloud computing node storage system 34 (FIG. 4). The unstructured data may include documents, for example, plain text documents, scanned documents, ADOBE® Portable Document Files (PDFs), and Microsoft® Word documents, as well as Web content such as online news and blogs.

In alternative embodiments, assigning a likelihood to each candidate answer according to CP may occur first, followed by ranking the candidate answers according to CR, without affecting the outcome. For example, for the query "Who was the last Republican president to serve in the military?", candidate answer generation module 116 may identify known instances of the LAT, "president", filter them via CB, "Republican", and assign a likelihood to each instance according to CP, "served in the military", as described above. The candidate answers may then be ranked according to CR, "last", as described above. While CB is typically applied as early as possible to reduce the number of candidate answers, it may also be applied at a later stage.

Hybrid answer ranking module 120 operates to reconcile CR and CP to produce a hybrid score, according to which the candidate answers identified by candidate answer generation module 116 may be ranked. For example, for the query "Who was the last Republican president to serve in the military?", the candidate answer with the highest hybrid score may represent the Republican president most likely to be the last one to have served in the military. Hybrid answer ranking module 120 may compute a hybrid score, for example, as illustrated in Table 1.

For certain queries it may be necessary for hybrid answer ranking module 120 to compute hybrid scores multiple times for the candidate answers identified by candidate answer generation module 116. For example, for the query "Who was the second president to have a mustache?", with CR the ordinal "second" and CP "to have a mustache", hybrid answer ranking module 120 may compute a hybrid score to identify a candidate answer likely to be the first president to satisfy CP, eliminate the identified first president and all previous presidents from the list of candidates answers, and then compute hybrid scores for all candidates in the reduced list, in order to identify a candidate answer likely to be the second president to satisfy CP.

Table 1 is an example program in pseudo-code, that implements a combined ranking procedure, in accordance to an exemplary embodiment of the invention. The output of line 1 is a list of candidate answers $\{L_1, \ldots, L_n\}$, filtered relative to CB and ranked according to CR, with $L_1$ the top ranked candidate, $L_2$ the next lower ranked candidate, and so on. For each candidate $L_i$, a function P provides a probability $p_i$ that CP is satisfied (line 4). If it could be discerned that $L_1$ satisfies CP, it would be the answer sought. If it does not, but $L_2$ does, then $L_2$ would be the sought after answer; and so on down the list. For example, suppose that the probability that $L_1$ satisfies CP is $p_1$. The next entity $L_2$ is only the "right" answer if $L_1$ is not. The probability that $L_2$ satisfies CP and $L_1$ does not satisfy CP is the product $p_2(1-p_1)$. Similarly, the probability that $L_3$ is the answer is the product $p_3(1-p_2)(1-p_1)$, and likewise for every other entity in the list. The computational loop in lines 3-7 assigns scores $S(L_i)$ according to this schema. Line 6 addresses candidates that are equally ranked relative to CR.

TABLE 1

SAMPLE PROGRAM IN PSEUDO-CODE
FOR IMPLEMENTING HYBRID SORT

| | |
|---|---|
| 1 | Rank and filter input candidates by CR and CB, producing candidate list $\{L_1, L_2, L_3 \ldots L_n\}$. |
| 2 | w = 1.0 |
| 3 | for i = 1 .. n do |
| 4 |    p = P($L_i$) |
| 5 |    S($L_i$) = w * p |
| 6 |    Repeat previous step for all candidates $L_j$ following $L_i$ with the same rank according to CR. Advance i to the last of these. |
| 7 |    w = w * (1.0 − p) |
| 8 | Sort the candidates by S |

After the candidate answers generated by candidate answer generation module 116 have been ranked by hybrid answer ranking module 120, the ranked list may be formatted and returned to the requestor, for example, for display on a GUI 128.

In other embodiments of the invention, probabilistic answer scoring module 118 may identify, based on a threshold value or filter, a subset of the candidate answers generated by candidate answer generation module 116, and hybrid answer ranking module 120 may rank and return only elements in the identified subset of candidate answers.

Figure 2:
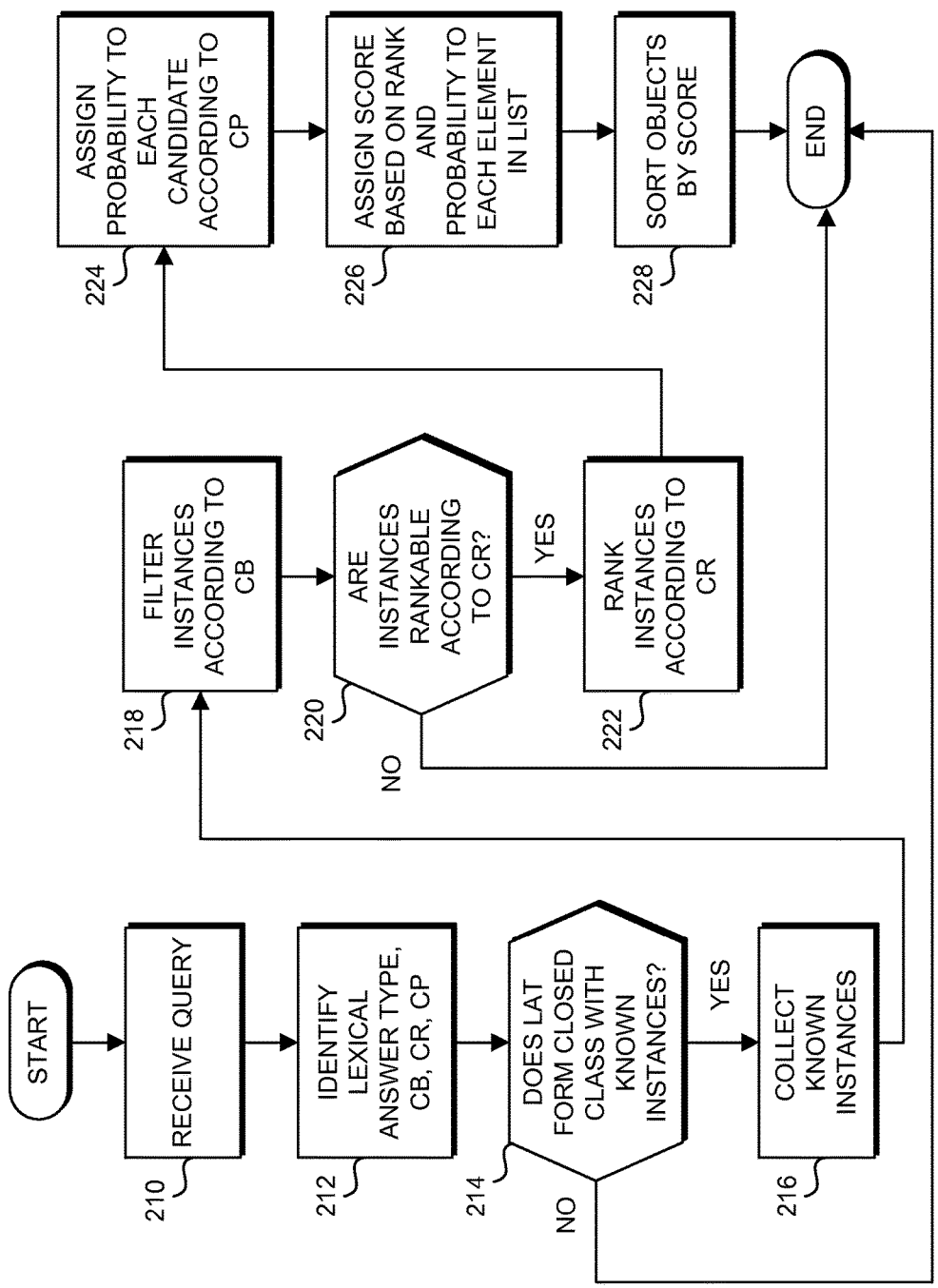
FIG. 2 is a flowchart depicting operational steps of an RPQA program, in accordance with an embodiment of the present invention.

FIG. 2 is a flowchart depicting operational steps of RPQA program 112, in accordance with an exemplary embodiment of the invention. RPQA program 112 may receive a query (step 210), for example, from a client computing device 126. Query analysis module 114 analyzes the query to identify a LAT, CB, CR, and CP (step 212). Candidate answer generation module 116 determines whether the LAT forms a closed class with known instances (decision step 214). If the LAT does not form a closed class with known instances (decision step 214, "NO" branch), processing ends. If the LAT forms a closed class with known instances (decision step 214, "YES" branch), candidate answer generation module collects the known instances (step 216) and stores them in an internal or external datastore, for example on computer readable storage media 308. Candidate answer generation module 116 may reduce the set of known instances by applying the filter associated with CB (step 218). Candidate answer generation module 116 determines whether the set of instances, viewed as structured data, may be ranked according to CR (decision step 220). If the set of instances cannot be ranked according to CR (decision step 220, "YES" branch), candidate answer generation module 116 ranks them according to CR (step 222). In some cases, certain candidates may be equally ranked according to CR. If the set of instances may not be ranked according to CR (decision step 220, "NO" branch), processing ends. Probabilistic answer scoring module 118 assigns a probability P, representing a confidence score relative to CP, to each ranked candidate answer (step 224). Hybrid answer ranking module 120 assigns a hybrid score S, which reconciles CR with CP, to each element in the ranked list of candidate answer (step 226). RPQA program 112 may order the list of candidate answers according to the hybrid scores (step 228). In typical embodiments, only the element in the final list of candidate answers with highest hybrid score is required; other embodiments may employ the entire list.

For example, if the query received by RPQA program 112 is "Who was the last Republican president to have served in the military?", query analysis module 114 may determine that the LAT is "president", CB is "Republican," CR is election date, and CP is "served in the military". Candidate answer generation module 116 may collect all known instances of the LAT "president", reduce the list of presidents according to CB to Republican presidents, and rank the list of Republican presidents by CR, their date of election, to produce a ranked list of candidate answers. Probabilistic answer scoring module 118 may assign a likelihood according to CP that each Republican president served in the military. Hybrid answer ranking module 120 may assign a hybrid score, based on the president's election date and the likelihood that the president served in the military, such that the president with the highest hybrid score is the president most likely to be the last Republican president to have served in the military.

Figure 3:
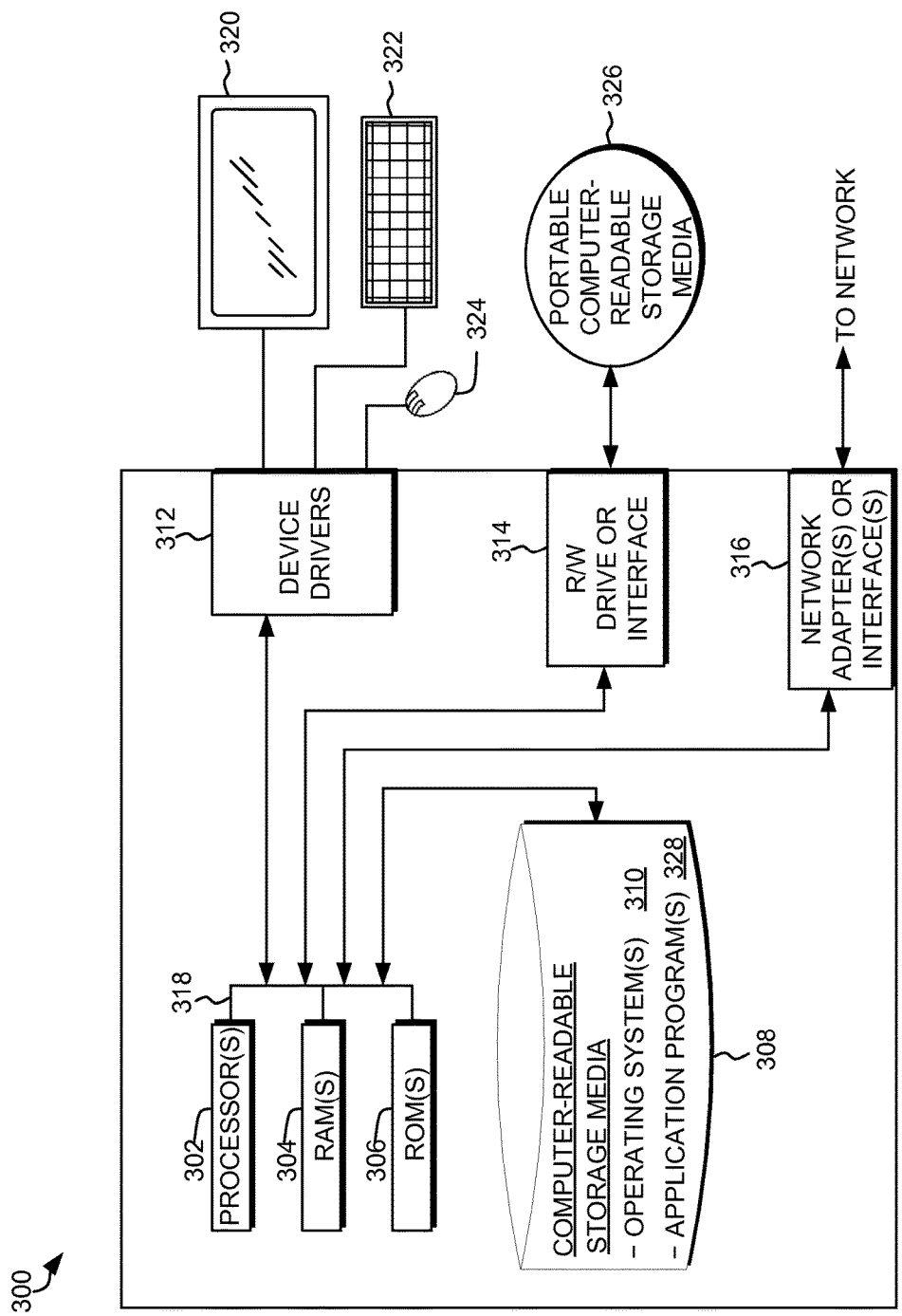
FIG. 3 is a functional block diagram of a data processing environment, in accordance with an embodiment of the present invention.
Figure 4:
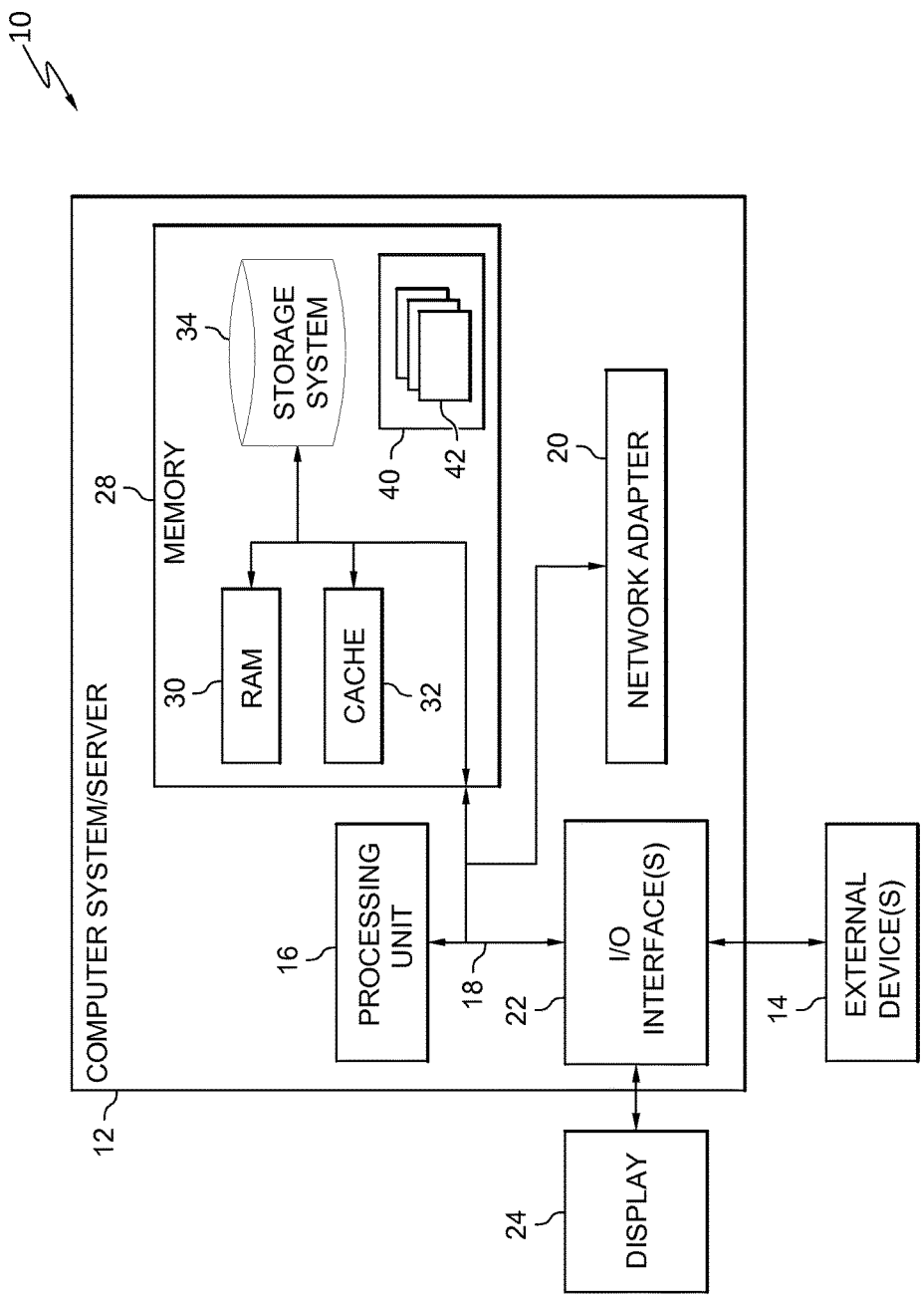
FIG. 4 is a functional block diagram of a cloud computing node according to an embodiment of the present invention.

FIG. 3 depicts a block diagram 300 of components of client computing devices 126 and/or a server 110 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Client computing devices 126 and/or a server 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 328, for example, RPQA program 112, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other non-transitory, computer-readable, tangible storage device, which can store a computer program and digital information.

Client computing devices 126 and/or a server 110 may also include a R/W drive or interface 314 to read from and write to one or more portable computer readable storage media 326. Application programs 328 on client computing devices 126 and/or a server 110 may be stored on one or more of the portable computer readable storage media 326, read via the respective R/W drive or interface 314 and loaded into the respective computer readable storage media 308.

Client computing devices 126 and/or a server 110 may also include a network adapter or interface 316, such as a TCP/IP adapter card or wireless communication adapter (such as a 4G wireless communication adapter using OFDMA technology). Application programs 328 on client computing devices 126 and/or a server 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Client computing devices 126 and/or a server 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
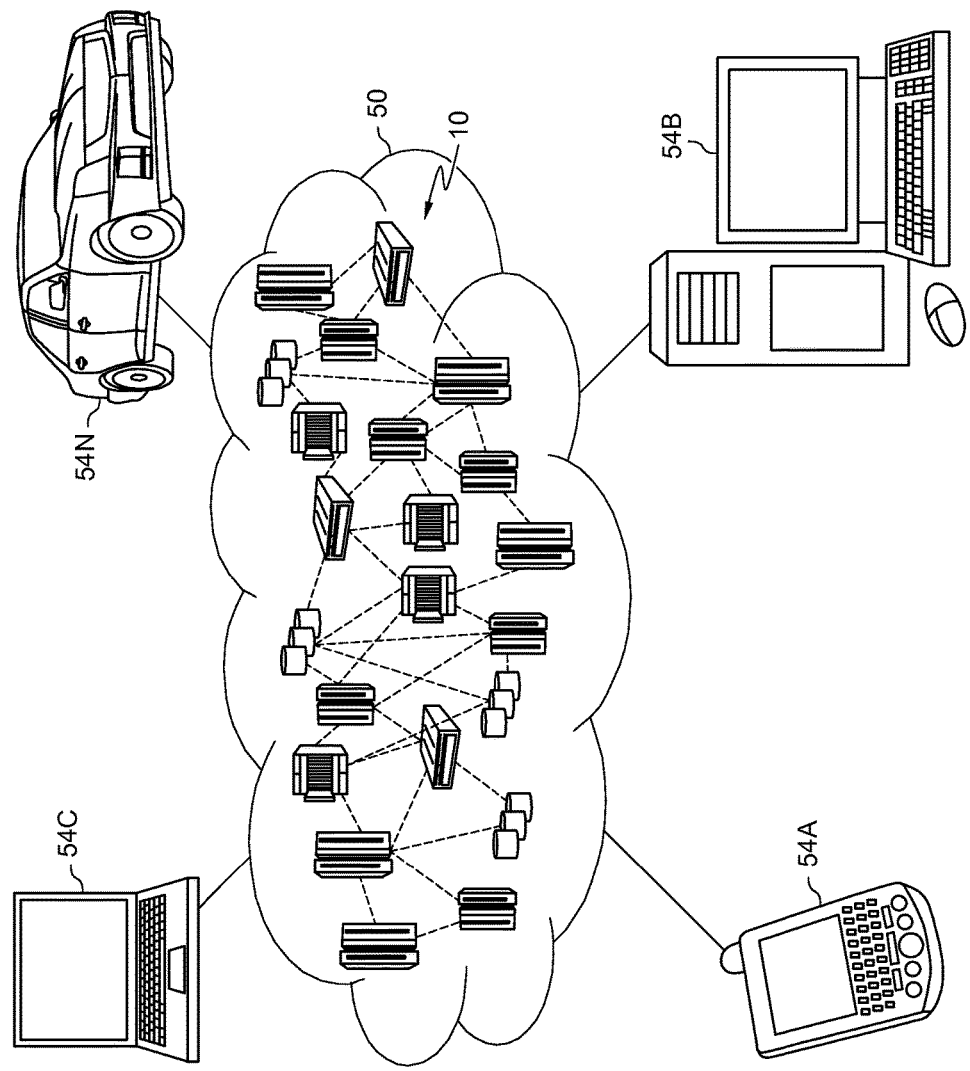
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
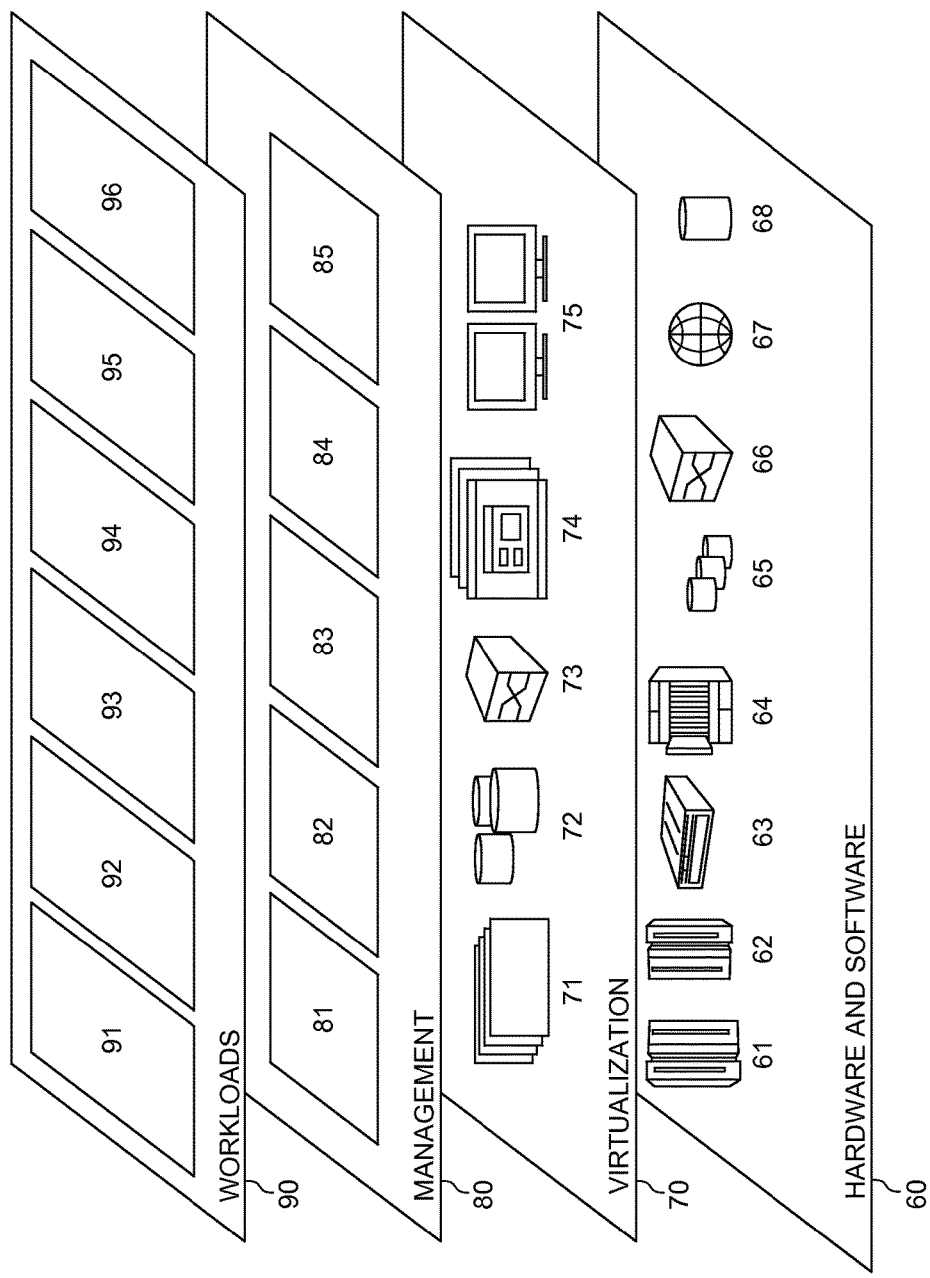
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and question answering 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for providing answers to questions, the method comprising:
   receiving, by a computer, a query;
   identifying, by the computer, a lexical answer type (LAT), a rankable criterion, and a probabilistic criterion in the query, wherein a rankable criterion refers to components of the query that contain ordinals and/or superlatives, and a probabilistic criterion refers to components of the query that contain phrases that modify the LAT;
   generating, by the computer, a set of candidate answers to the query that are instances of the LAT identified in a structured data source;
   assigning, by the computer, a rank to each candidate answer, based on the rankable criterion;
   assigning, by the computer, a likelihood to each candidate answer, that the candidate answer satisfies the probabilistic criterion, based on a statistic of occurrences of terms related to the candidate answer and to the probabilistic criterion in text passages from an unstructured data source;
   selecting, by the computer, one or more candidate answers, based on the product of the likelihood that the candidate answer satisfies the probabilistic criterion and the likelihoods that each candidate answer of lower rank does not satisfy the probabilistic criterion; and
   transmitting, by the computer, the selected candidate answers.

2. A method in accordance to claim 1, wherein
   identifying, by the computer, further comprises identifying a Boolean criterion in the query, wherein a Boolean criterion refers to a component of the query that modifies the LAT and is either entirely true or entirely false for the LAT, and the probabilistic criterion refers to components of the query that contain phrases that modify the LAT and are not Boolean criterion; and wherein the method further comprises:

reducing, by the computer, the set of candidate answers by applying the Boolean criterion.

3. A method in accordance to claim 1, wherein identifying, by the computer, further comprises using a natural language parser or a named entity recognition program.

4. A method in accordance to claim 1, further comprising:

identifying a subset of the ranked candidate answers based on a threshold value or filter; and wherein assigning a likelihood further comprises:

assigning, by the computer, to each ranked candidate answer in the identified subset of ranked candidate answers a likelihood that the ranked candidate answer satisfies the probabilistic criterion, based on a statistic of occurrences of terms related to the ranked candidate answer and to the probabilistic criterion in text passages from an unstructured data source;

and wherein selecting further comprises:

selecting, by the computer, one or more candidate answers in the identified subset of ranked candidate answers, based on the rank and the likelihood of the candidate answers.

* * * * *